United States Patent
Astigarraga et al.

(10) Patent No.: US 10,073,772 B2
(45) Date of Patent: Sep. 11, 2018

(54) COPY-ON-WRITE IN CACHE FOR ENSURING DATA INTEGRITY IN CASE OF STORAGE SYSTEM FAILURE

(71) Applicant: INTERNATIONAL BUSINESS MACHINES CORPORATION, Armonk, NY (US)

(72) Inventors: Tara Astigarraga, Fairport, NY (US); Itzhack Goldberg, Hadera (IL); Gerhard H. Pieper, Mainz (DE); Neil Sondhi, Pilisborosjeno (HU); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 15/016,800

(22) Filed: Feb. 5, 2016

(65) Prior Publication Data
US 2017/0228314 A1 Aug. 10, 2017

(51) Int. Cl.
*G06F 12/00* (2006.01)
*G06F 12/0802* (2016.01)

(52) U.S. Cl.
CPC .. *G06F 12/0802* (2013.01); *G06F 2212/1032* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 6,957,301 B2 | 10/2005 | Deenadhayalan et al. | |
| 7,159,069 B2 | 1/2007 | Adusumilli et al. | |
| 7,225,363 B2 | 5/2007 | Drogichen et al. | |
| 7,640,395 B2 | 12/2009 | Coulson et al. | |
| 9,087,006 B2 | 7/2015 | Yochai et al. | |
| 9,189,326 B2 | 11/2015 | Kalamatianos et al. | |
| 2013/0117233 A1* | 5/2013 | Schreter | G06F 7/00 707/648 |
| 2016/0063255 A1* | 3/2016 | Jeansonne | G06F 9/4401 713/2 |

OTHER PUBLICATIONS

IBM, "Cache Memory Structure for Tolerating Faults," An IP.com Prior Art Database Technical Disclosure, May 1, 1995 (3 pages).
Nu et al., "eNVy: A Non-Volatile, Main Memory Storage System," ASPLOS VI Proceedings of the sixth international conference on Architectural support for programming languages and operating systems, 1994 (12 pages).

* cited by examiner

*Primary Examiner* — Daniel D Tsui
(74) *Attorney, Agent, or Firm* — Griffiths & Seaton PLLC

(57) ABSTRACT

Various embodiments for managing data integrity in a computing storage environment, by a processor device, are provided. In one embodiment, a method comprises applying a copy-on-write technique to a cache in a computer storage system such that each write arriving in the cache is assigned to a separate new physical location and registered sequentially in an order the write arrived, for preserving a state of the computer storage system during a failure event.

18 Claims, 3 Drawing Sheets

US 10,073,772 B2

COPY-ON-WRITE IN CACHE FOR ENSURING DATA INTEGRITY IN CASE OF STORAGE SYSTEM FAILURE

BACKGROUND OF THE INVENTION

Field of the Invention

The present invention relates in general to computing systems, and more particularly, to various embodiments for managing data integrity in computer storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components.

SUMMARY OF THE INVENTION

Various embodiments for managing data integrity in a computing storage environment, by a processor device, are provided. In one embodiment, a method comprises applying a copy-on-write technique to a cache in a computer storage system such that each write arriving in the cache is assigned to a separate new physical location and registered sequentially in an order the write arrived, for preserving a state of the computer storage system during a failure event.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
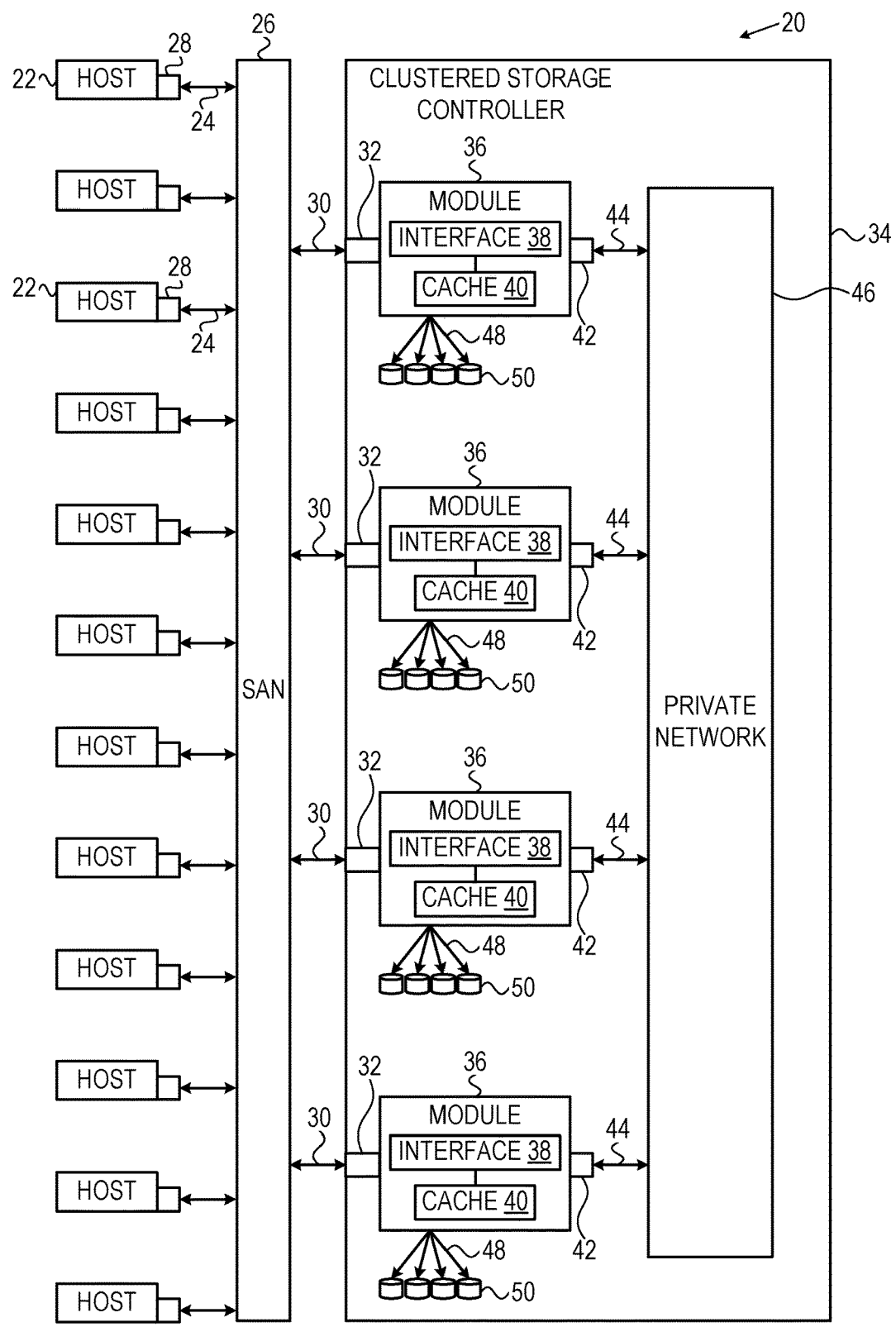
FIG. 1 is a block diagram illustrating a computer storage environment in which aspects of the present invention may be realized.

Described embodiments, and illustrative Figures of various embodiments for managing data integrity in a computer storage system are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

All advanced storage array appliances use cache as means to reduce input/output operation (I/O) latencies. Dynamic random access memory (DRAM) cache is about one million times faster than the speed of native (cache-less) spinning disks. Even the much faster flash-based storage is still one thousand times slower than the common place DRAM cache. The cache allows for more efficient and faster provision of data to respective applications. Dirty data, according to a specific algorithm, in cache is destaged and committed to a persistent, non-volatile media in the background without impacting the applications' performance.

The cache, by its nature, is a volatile storage, as it requires power to retain its data. In attempt to handle a sudden power failure which brings down computer systems ungracefully, sophisticated redundant power supplies are mandated, as well as having uninterruptible power supply (UPS) units which, in case of a power failure, at least allow the system to dump the volatile data onto a persistent media such that the data may be recovered when the power is restored. Having a UPS connected to the system is geared toward preventing data loss. At times, however, the UPS units also fail or do not engage because of system defects. In these cases, not only the cached data is lost, but the system data integrity and consistency is at risk, as the cached data is not necessarily destaged in an order the data was written to the storage array. There are systems which rank data integrity more important than data latency, and in some cases, the data is written through the cache directly to the persistent media.

Much time is spent by support personnel on recovering storage array data integrity. Most of this work is manual and requires very deep understanding of the system's internal architecture, and as such, this process is very error prone. Mind you, most recovery efforts are not aimed at recovering lost data, however "just" resuming the storage to a past time state where the data on the storage was consistent. In doing so, one might end up losing even more data than only the data in the cache at the time of the failure.

The most accepted mitigation in storage arrays is to design the system to sustain a single point of failure. To that end, the system is built as a cluster of machines with redundant components, such that if one node fails/crashes, the data can still be retrieved from another node. This concept may give benefit and particularly apply to hardware components. Alas, hardware components often enough have each their own firmware, and if a defect exists in such firmware, a failure may span/roll throughout an entire system, rendering the sophisticated avoidance of a single point of failure a mere wishful thinking. The same holds true for an appliance itself, which is also heavily dependent on microcode which is common to all of the appliance's modules. There too, a single bug may cause a rolling effect and crash the system before the cache data can be preserved.

In view of the foregoing, the mechanisms of the illustrated embodiments provide various solutions to previous challenges of managing data integrity, particularly in cache, in computer storage systems. These mechanisms include such functionality as applying a copy-on-write technique to a cache of the computer storage system, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
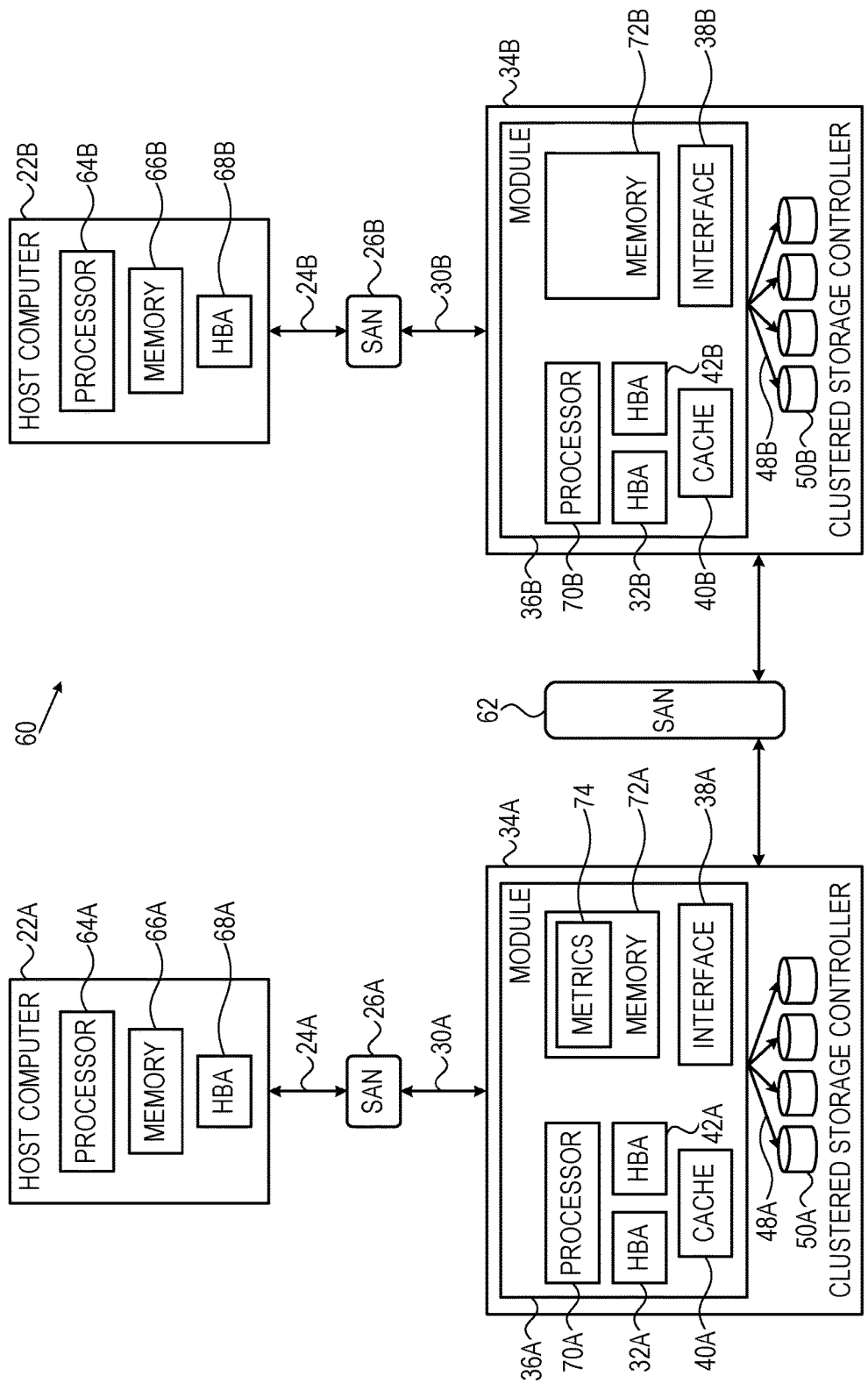
FIG. 2 is a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2, storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
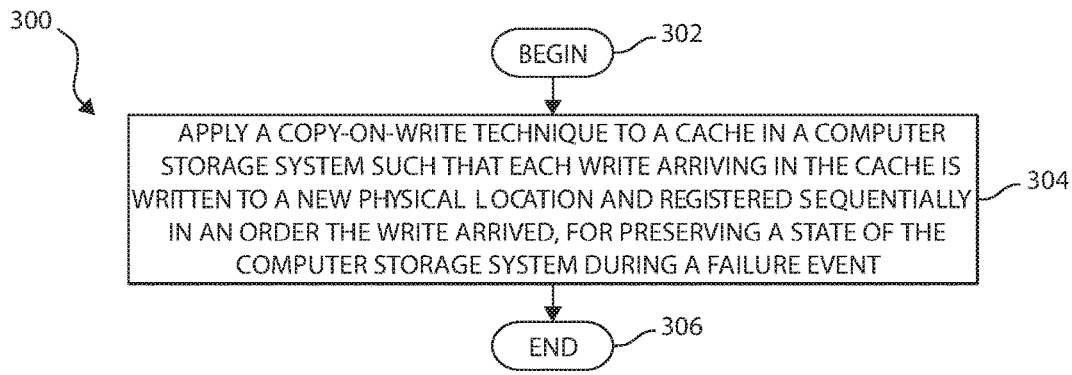
FIG. 3 is a flow chart illustrating a method for managing data integrity in a computer storage system in accordance with aspects of the present invention.

Continuing to FIG. 3, a method 300 for managing data integrity in a computer storage system is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, a copy-on-write technique is applied to a cache in a computer storage system such that each new write arriving in the cache is assigned to a separate new physical location and registered sequentially in an order the write arrived, for preserving a state of the computer storage system during a failure event (step 304). The method ends (step 306).

The copy-on-write technique is well known in the art and widely used for snapshot creation, such that a storage system may retain a point-in-time image of the storage while continuing to service new I/Os. This technique is known to be very fast and efficient. The present invention, in one embodiment, uses a variation of the copy-on-write technique as applied to a cache of the storage system. The copy-on-write technique enables a retention of the write order of incoming data into the cache. In this way, dirty data may be destaged to a persistent media in the order it was written to the cache. Consecutive writes to the same data are to be written to the same address as is commonly performed today. However, interleaved writes to the same are ordered and physically written to different addresses in the cache. Having a cache copy-on-write mechanism in place guaranties that the persistent data is consistent at all times.

In one embodiment, the present invention provides for a cache in a storage array to be maintained in a manner of first-in first-out (FIFO) by time of any incoming write I/O to a volume or a volume consistency group. The data is then destaged to the persistent media in sequential order by the same fashion, such that the first data to be written in the cache is the first data destaged to the persistent media. By this innovation, the volumes or volume groups at the level of the final destination of the data in a storage array are consistent at all times, including times of both hardware failures (e.g. power loss), and software failures (e.g. coding errors). In either a hardware or software failure, the mechanisms of the present invention provide for preserving a state of the storage system, including the cache, such that the storage system easily maintains a pattern for incoming and outgoing data to and from the cache.

In other embodiments, the functionality described herein may be applied to other computing components, such as a redundant array of independent disks (RAID) adapter within a storage array, positioned between incoming I/O and a final destination of the I/O at a hard disk drive (HDD), solid state drive (SSD), or flash, so long as volume objects are maintained inside the storage component like the RAID adapter. In still other embodiments, a timestamp of the latest consistent recovery point of the cache is written to an external log file in a network time protocol (NTP) maintained environment. Adding this timestamp to host or host applications, like databases, provides further improvement to the recovery point objective (RPO) and the recovery time objective (RTO).

As aforementioned, each write arriving at the cache in the storage is placed at a new physical location and registered sequentially, in the order it arrived. The only exception to this rule is when successive writes are written to the same data block. In such a case, the same original address may be reused. An ordering list maintained by the cache will be consulted when cache is about to perform a destage operation to determine which data to destage to the persistent media. Data is marked for destaging based upon the sequential order the data originally arrived in the cache. In other words, if a certain data is deemed necessary to be hardened (i.e. destage to the persistent media), the cache will harden each data that arrived prior to the certain data. The actual destage operation may be triggered by a predetermined or existing algorithm, however during the operation, data is destaged as per the sequential order it was written in the cache. In this way, cache can optimize its work, and at the same time, keep the persistent data consistent at all time. This sequential approach changes the way data is written to make it easier to preserve a state of the storage system when an unexpected failure (e.g. power down) occurs.

Prior to the functionality presented herein, caches generally employed a specific algorithm in order to decide which dirty data to destage. A common algorithm used to decide which data is dirty data, and therefore data to be destaged, is a least recently used (LRU) algorithm. Using the mechanisms of the present invention, these or other predetermined algorithms may still be employed (e.g. data not recently used), however any intervening writes per their order must to be destaged. In other words, the functionality presented herein does not trigger an initial destage operation, however dictates what data must also be destaged in a correct order once the destage operation is performed.

Figure 4:
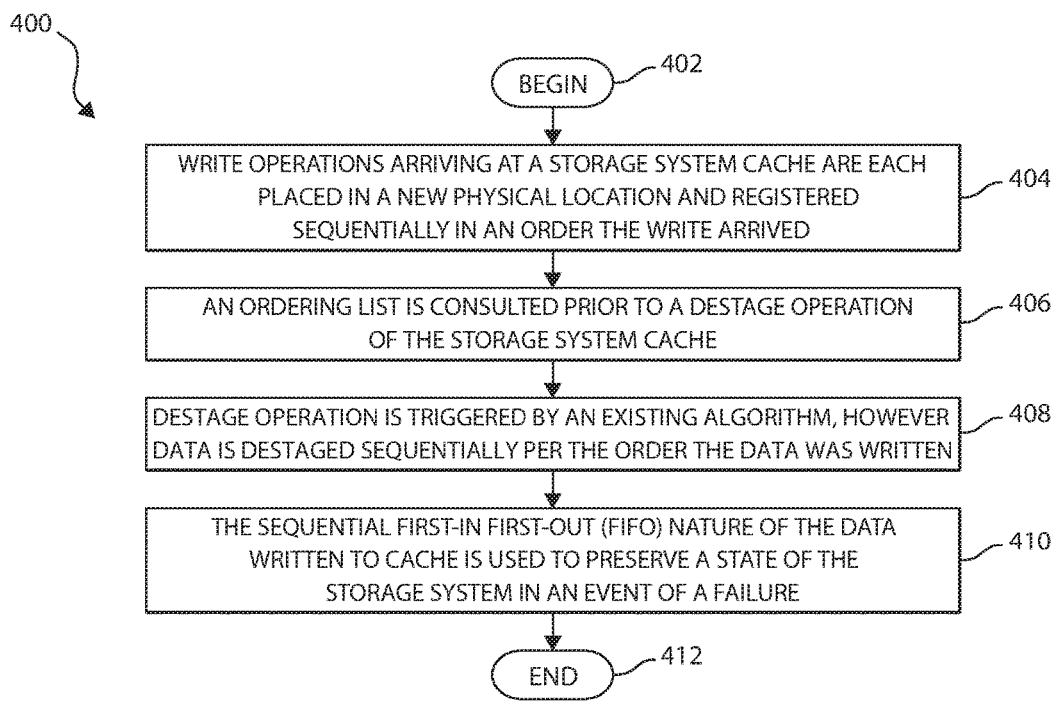
FIG. 4 is an additional flow chart illustrating a method for managing data integrity in a computer storage system in accordance with aspects of the present invention.

FIG. 4 illustrates an additional flow chart of a method 400, reviewing managing data integrity in a computer storage system. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present description.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 402, write operations arriving at a storage system cache are each placed in a separate new physical location and registered sequentially in an order the write arrived (step 404). An ordering list of all data contained in the cache is consulted prior to performing a destage operation of the storage system cache, for determining which data must be destaged. The data is marked to be destaged in sequential order by order of when the data was originally written in the cache (step 406). The destage operation may be triggered by an existing algorithm (e.g. an LRU algorithm), however when performing the destage operation, data is then destaged sequentially per the order the data was written in the cache (step 408). The sequential first-in first-out (FIFO) nature of the data written in cache is used to preserve a state of the storage system during a failure event, whether hardware or software (step 410). As an example, a hardware failure may be triggered by an unexpected power loss for a variety of reasons, and a software failure may be triggered by coding errors contained within the software itself. The method ends (step 412).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data integrity in a computing storage environment, by a processor device, comprising:
    applying a copy-on-write technique to a cache in a computer storage system such that each interleaved write arriving in the cache is assigned to a separate new physical location and registered sequentially in an order the write arrived notwithstanding consecutive writes, received in due course with the interleaved writes and being written to a same data block in the cache, are written to a same physical location such that the same physical location is reused for each of the consecutive writes, for preserving a state of the computer storage system during a failure event; and
    triggering a destage operation using an existing least recently used (LRU) algorithm while commensurately destaging the interleaved writes in the order the write arrived in cache such that the LRU triggers the destage operation yet the interleaved writes are additionally destaged with LRU data during the destage operation in the order the interleaved writes arrived in the cache.

2. The method of claim 1, further including maintaining, by the cache, an ordering list of all data held in the cache, the ordering list listing all of the data held in the cache in the sequential order in which each write arrived in the cache.

3. The method of claim 2, further including, prior to the cache performing the destage operation, determining which of the data held in the cache to destage by consulting the ordering list.

4. The method of claim 3, further including marking the determined data for destaging to a persistent media in a first-in-first-out (FIFO) manner, such that the determined data is destaged sequentially based upon the order the write arrived in the cache.

5. The method of claim 1, further including attaching a timestamp of a latest consistent recovery point of the cache to an external log file in a Network Time Protocol (NTP) maintained environment.

6. The method of claim 1, wherein the failure event comprises at least one of a hardware failure and a software failure.

7. A system for managing data integrity in a computing storage environment, the system comprising:
    at least one processor device, wherein the at least one processor device:
        applies a copy-on-write technique to a cache in a computer storage system such that each interleaved write arriving in the cache is assigned to a separate new physical location and registered sequentially in an order the write arrived notwithstanding consecutive writes, received in due course with the interleaved writes and being written to a same data block in the cache are written to a same physical location such that the same physical location is reused for each of the consecutive writes, for preserving a state of the computer storage system during a failure event; and
        triggers a destage operation using an existing least recently used (LRU) algorithm while commensurately destaging the interleaved writes in the order the write arrived in cache such that the LRU triggers the destage operation yet the interleaved writes are additionally destaged with LRU data during the destage operation in the order the interleaved writes arrived in the cache.

8. The system of claim 7, wherein the at least one processor device maintains, by the cache, an ordering list of all data held in the cache, the ordering list listing all of the data held in the cache in the sequential order in which each write arrived in the cache.

9. The system of claim 8, wherein the at least one processor device, prior to the cache performing the destage operation, determines which of the data held in the cache to destage by consulting the ordering list.

10. The system of claim 9, wherein the at least one processor device marks the determined data for destaging to a persistent media in a first-in-first-out (FIFO) manner, such that the determined data is destaged sequentially based upon the order the write arrived in the cache.

11. The system of claim 7, wherein the at least one processor device attaches a timestamp of a latest consistent recovery point of the cache to an external log file in a Network Time Protocol (NTP) maintained environment.

12. The system of claim 7, wherein the failure event comprises at least one of a hardware failure and a software failure.

13. A computer program product for managing data integrity in a computing storage environment, by a processor device, the computer program product embodied on a non-transitory computer-readable storage medium having computer-readable program code portions stored therein, the computer-readable program code portions comprising:

an executable portion that applies a copy-on-write technique to a cache in a computer storage system such that each interleaved write arriving in the cache is assigned to a separate new physical location and registered sequentially in an order the write arrived notwithstanding consecutive writes, received in due course with the interleaved writes and being written to a same data block in the cache are written to a same physical location such that the same physical location is reused for each of the consecutive writes, for preserving a state of the computer storage system during a failure event; and an executable portion that triggers a destage operation using an existing least recently used (LRU) algorithm while commensurately destaging the interleaved writes in the order the write arrived in cache such that the LRU triggers the destage operation yet the interleaved writes are additionally destaged with LRU data during the destage operation in the order the interleaved writes arrived in the cache.

14. The computer program product of claim 13, further including an executable portion that maintains, by the cache, an ordering list of all data held in the cache, the ordering list listing all of the data held in the cache in the sequential order in which each write arrived in the cache.

15. The computer program product of claim 14, further including an executable portion that, prior to the cache performing the destage operation, determines which of the data held in the cache to destage by consulting the ordering list.

16. The computer program product of claim 15, further including an executable portion that marks the determined data for destaging to a persistent media in a first-in-first-out (FIFO) manner, such that the determined data is destaged sequentially based upon the order the write arrived in the cache.

17. The computer program product of claim 13, further including an executable portion that attaches a timestamp of a latest consistent recovery point of the cache to an external log file in a Network Time Protocol (NTP) maintained environment.

18. The computer program product of claim 13, wherein the failure event comprises at least one of a hardware failure and a software failure.

* * * * *